US012722900B2

(12) United States Patent
Shan et al.

(10) Patent No.: US 12,722,900 B2
(45) Date of Patent: Sep. 1, 2026

(54) SORTING VEHICLE AND SORTING MACHINE

(71) Applicant: Beijing Jingdong Qianshi Technology Co., Ltd., Beijing (CN)

(72) Inventors: Wenjun Shan, Beijing (CN); Li Zhang, Beijing (CN); Guoku Song, Beijing (CN); Yuwen Tang, Beijing (CN); Bin Li, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 441 days.

(21) Appl. No.: 18/282,715

(22) PCT Filed: Jan. 5, 2022

(86) PCT No.: PCT/CN2022/070252

§ 371 (c)(1),
(2) Date: Sep. 18, 2023

(87) PCT Pub. No.: WO2022/193801

PCT Pub. Date: Sep. 22, 2022

(65) Prior Publication Data

US 2024/0157743 A1 May 16, 2024

(30) Foreign Application Priority Data

Mar. 18, 2021 (CN) ......................... 202110291934.5

(51) Int. Cl.
*B65G 17/06* (2006.01)
*B60D 1/62* (2006.01)
(Continued)

(52) U.S. Cl.
CPC ......... *B65G 17/067* (2013.01); *B65G 17/345* (2013.01); *B65G 35/06* (2013.01);
(Continued)

(58) Field of Classification Search
CPC ...... B65G 17/067; B65G 35/06; B65G 17/30; B65G 17/345; B65G 47/96; B60D 1/62; H01B 7/0045; H02G 11/006
(Continued)

(56) References Cited

U.S. PATENT DOCUMENTS 5,676,514 A 10/1997 Higman et al.
5,701,992 A 12/1997 Enomoto
(Continued)

FOREIGN PATENT DOCUMENTS

CN H 11263567 A 9/1999
CN 103928881 A 7/2014
(Continued)

OTHER PUBLICATIONS

English Translation of Chinese First Office Action dated Mar. 22, 2022 for Chinese Patent Application No. 202110291934.5.
(Continued)

*Primary Examiner* — James R Bidwell
(74) *Attorney, Agent, or Firm* — K&L Gates LLP

(57) ABSTRACT

A sorting vehicle is provided that includes a wire harness structure and at least two vehicle bodies. The at least two vehicle bodies are pivotally connected to one another in sequence, the wire harness structure is connected to the two adjacent vehicle bodies, and the wire harness structure includes an elastic deformation portion located at a junction of the two adjacent vehicle bodies.

12 Claims, 4 Drawing Sheets

(51) Int. Cl.

| | |
|---|---|
| ***B65G 17/30*** | (2006.01) |
| ***B65G 17/34*** | (2006.01) |
| ***B65G 35/06*** | (2006.01) |
| ***B65G 47/96*** | (2006.01) |

(52) U.S. Cl.
CPC ................ *B60D 1/62* (2013.01); *B65G 17/30* (2013.01); *B65G 47/96* (2013.01)

(58) Field of Classification Search
USPC ...................................................... 198/370.06
See application file for complete search history.

(56) References Cited

U.S. PATENT DOCUMENTS

| | | | | |
|---|---|---|---|---|
| 8,752,695 | B2 * | 6/2014 | Kwasniewicz | B65G 25/04 198/764 |
| 10,494,193 | B2 * | 12/2019 | Sørensen | B65G 47/962 |
| 10,633,189 | B2 * | 4/2020 | Fumagalli | B07C 5/36 |
| 11,440,743 | B2 * | 9/2022 | Danelski | B65G 13/02 |
| 2016/0152450 | A1 | 6/2016 | Murakami et al. | |

FOREIGN PATENT DOCUMENTS

| | | | | |
|---|---|---|---|---|
| CN | 105438215 | A | 3/2016 | |
| CN | 107738862 | A | 2/2018 | |
| CN | 208265182 | U | 12/2018 | |
| CN | 209336652 | U | 9/2019 | |
| CN | 209886196 | U | 1/2020 | |
| CN | 211418597 | U | 9/2020 | |
| CN | 211418812 | U | 9/2020 | |
| CN | 111762522 | A | 10/2020 | |
| CN | 111799745 | A | 10/2020 | |
| CN | 211811775 | U | 10/2020 | |
| CN | 212442089 | U | 2/2021 | |
| CN | 112875202 | A | 6/2021 | |
| CN | 215158494 | U | 12/2021 | |
| DE | 19614060 | C1 | 5/1997 | |
| JP | H02182613 | A | 7/1990 | |
| JP | H 8324791 | A | 12/1996 | |
| JP | 2000188319 | A * | 7/2000 | B65G 49/07 |
| JP | 2016110193 | A | 6/2016 | |

OTHER PUBLICATIONS

PCT International Search Report dated Mar. 23, 2022, for International Patent Application No. PCT/CN2022/070252.
English Translation of Chinese Second Office Action dated Jul. 29, 2022 for Chinese Patent Application No. 202110291934.5.
English Translation of Chinese Notice of Rejection dated Oct. 24, 2022 for Chinese Patent Application No. 202110291934.5.
European Search Report dated Feb. 7, 2025 for corresponding European Application No. 22770163.8.
First Office Action from related Japanese Patent Application No. 2023-557083 issued Oct. 15, 2024.

* cited by examiner

SORTING VEHICLE AND SORTING MACHINE

CROSS-REFERENCE TO RELATED APPLICATIONS

This patent application is a 35 U.S.C. § 371 National Stage filing based on International Application No. PCT/CN2022/070251, filed on Jan. 5, 2022, which application claims priority benefit to Chinese Patent Application No. 202110291934.5, filed with the China National Intellectual Property Administration (CNIPA) on Mar. 18, 2021, the disclosures of which are incorporated herein by reference in their entireties.

TECHNICAL FIELD

The present application relates to the field of logistics technology, for example, to a sorting vehicle and a sorting machine.

BACKGROUND

The sorting vehicle includes a wire harness structure and multiple sequentially connected vehicle bodies, each of the vehicle bodies includes a chassis and a chain structure, with one end of the chain structure pivotally connected to the corresponding chassis, and the other end of the chain structure pivotally connected to an adjacent chassis. The wire harness structure is connected to the chassis and extends in the arrangement direction of the multiple vehicle bodies, the wire harness structure is connected to drivers of the sorting vehicles, and the wire harness structure is capable of providing signals and electric power to the drivers. When the sorting vehicle is in a turning position, the adjacent vehicle bodies are not arranged in a straight line, but are arranged to be at a certain included angle, which may cause repeated bending of the wire harness structure, and cause the wire harness structure prone to breakage, shortening its service life, and resulting in poor operational stability of the sorting vehicle and the sorting machine utilizing the above-mentioned structure.

Accordingly, there is an urgent need to introduce a sorting vehicle and a sorting machine that address the issues of the wire harness structure susceptibility to breakage, short service life, and poor operational stability of the sorting vehicle and the sorting machine.

SUMMARY

A sorting vehicle is set forth in the present application, which can prevent bending damage of the wire harness structure, improve the service life of the wire harness structure, and improve operational stability of the sorting vehicle.

A sorting machine is further set forth in the present application, which can improve the operational stability of the sorting machine by applying the sorting vehicle as described above.

The present application adopts technical solutions described below.

In a first aspect, a sorting vehicle is provided according to the present application, which includes: at least two vehicle bodies and a wire harness structure.

The at least two vehicle bodies are pivotally connected to one another in sequence.

The wire harness structure is connected to two adjacent vehicle bodies, the wire harness structure includes an elastic deformation portion, and the elastic deformation portion is located at a junction of two adjacent vehicle bodies.

In a second aspect, a sorting machine is further provided according to the present application, which includes the sorting vehicle as described above.

REFERENCE NUMERALS IN THE DRAWINGS

Figure 1:
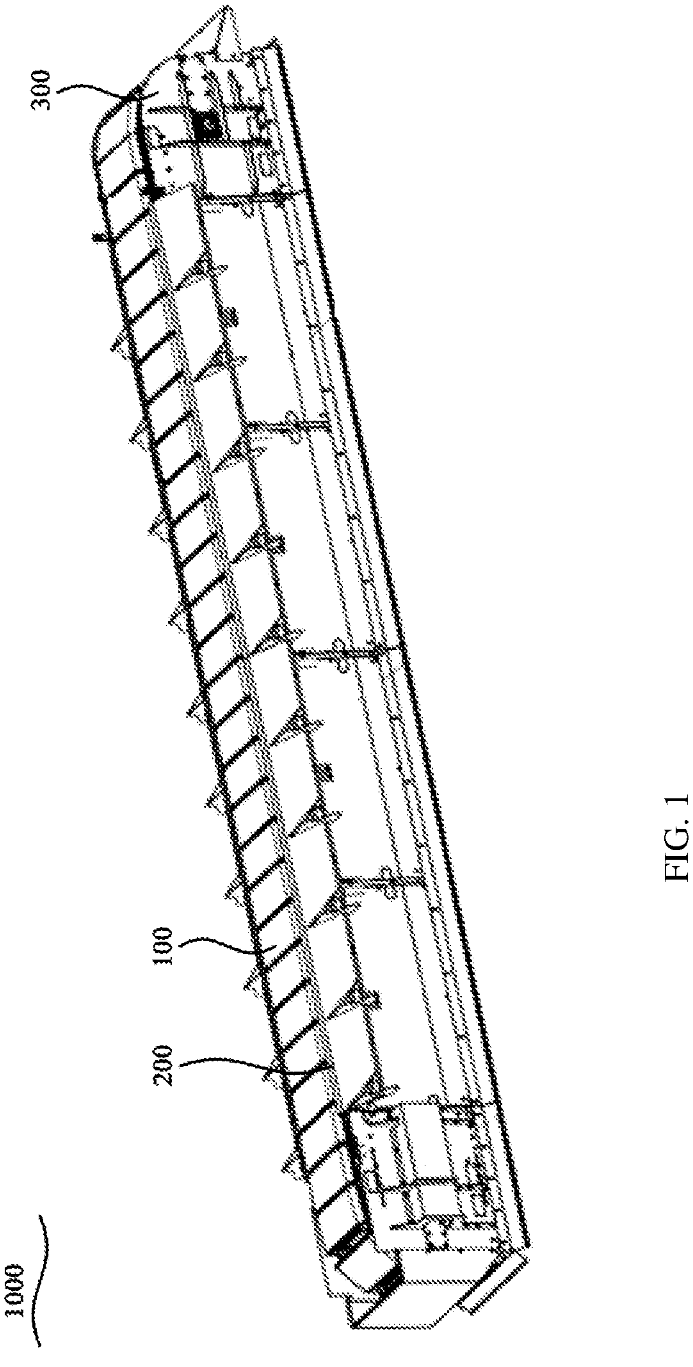
FIG. 1 is a schematic structural diagram of a sorting machine according to an embodiment.

1000—sorting machine;
100—sorting vehicle;
200—track assembly;
300—frame;
1—vehicle body;
11—chassis;
12—chain structure;
121—first connecting frame;
122—roller;
123—second connecting frame;
13—driver;
2—wire harness structure;
21—communication wire harness;
211—first elastic deformation portion;
212—first connecting portion;
22—electricity conductive wire harness;
221—second elastic deformation portion;
222—second connecting portion;
3—fixing structure;
31—mounting plate;
32—wire crimping member;
321—first accommodating recess;
322—first longitudinal recess;
323—first circular arc transition surface
324—second accommodating recess;
325—second longitudinal recess;
326—second circular arc transition surface;
33—fixing member;
4—wire splitter; and
5—split wire.

DETAILED DESCRIPTION

The present application is described in detail hereinafter in conjunction with the drawings and embodiments.

In the description of the present application, unless otherwise expressly specified and limited, the terms “join”, “connected”, “fixing” are to be construed in a broad sense, for example, as permanently connected, detachably connected, or integrally connected; mechanically connected or electrically connected; directly connected to each other or indirectly connected to each other via an intermediary; or internally connection of two components or interacting relationship of two elements. For the person of ordinary skill in the art, specific meanings of the preceding terms in the present application may be construed based on specific situations.

In this application, unless otherwise expressly specified and limited, a first feature being "on" or "under" a second feature may include direct contact between the first feature and the second feature, and may also include the first feature and the second feature not in direct contact but contact through another feature between them. Moreover, the first feature "on", "above" and "over" the second feature include that the first feature is directly above and obliquely above the second feature, or simply means that the horizontal level of the first feature is higher than the horizontal level of the second feature. The first feature "under", "below" and "beneath" the second feature include that the first feature is directly below and obliquely below the second feature, or simply means that the horizontal level of the first feature is smaller than the horizontal level of the second feature.

In the description of the present application, it is to be noted that, the orientational or positional relationships indicated by terms "above", "below", "left", "right" and the like are based on the orientational or positional relationships shown in the drawings, merely for ease of describing and simplifying the description, rather than indicating or implying that the referred device or element must have a specific orientation and is constructed and operated in a specific orientation, and thus they are not to be construed as limiting the present application. In addition, the terms "first", "second" are used only to distinguish between descriptions, and have no special implication.

As shown in FIG. 1, a sorting machine 1000 is provided according to this embodiment, which includes a sorting vehicle 100, a frame 300, a track assembly 200 and a drive assembly. Both the track assembly 200 and the drive assembly are mounted on the frame 300, the sorting vehicle 100 is arranged on the track assembly 200, and the drive assembly drives the sorting vehicle 100 to move along the track assembly 200.

Figure 2:
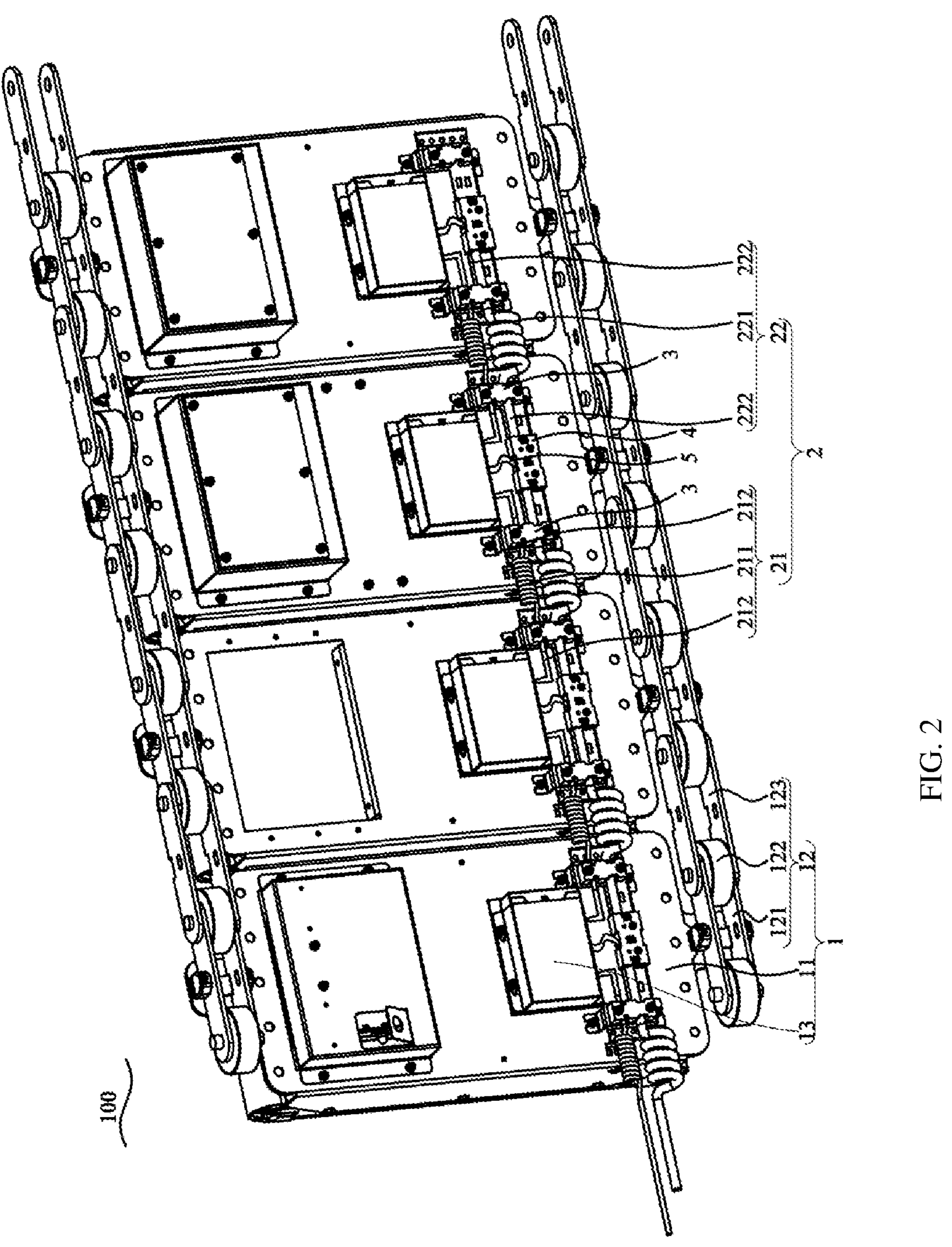
FIG. 2 is a schematic structural diagram of a sorting vehicle according to an embodiment.

As shown in FIG. 2, the sorting vehicle 100 includes a wire harness structure 2 and at least two vehicle bodies 1 connected in sequence. Each of the vehicle bodies 1 includes a chassis 11 and a chain structure 12. The chain structure 12 includes a first connecting frame 121, a roller 122 and a second connecting frame 123. The first connecting frame 121 is fixed to the chassis 11, the roller 122 is pivotally connected to the first connecting frame 121, one end of the second connecting frame 123 is pivotally connected to the first connecting frame 121 of the adjacent vehicle body 1, and the other end of the second connecting frame 123 is pivotally connected to the first connecting frame 121 of the vehicle body 1 adjacent thereto. The track assembly 200 is in a ring shape, and the roller 122 runs along the ring-shaped track assembly 200. The wire harness structure 2 is connected to two adjacent vehicle bodies 1, the wire harness structure 2 is electrically connected to drivers 13 of the vehicle bodies 1, and the wire harness structure can provide signals and electric power to the drivers. When the sorting vehicle 100 is in a turning position, the adjacent vehicle bodies 1 are not arranged in a straight line and is arranged to be at a certain included angle, causing the wire harness structure 2 to bend repeatedly and leading to the wire harness structure 2 becoming prone to damage and having a short service life, and resulting in poor operational stability of both the sorting vehicle 100 and the sorting machine 1000 incorporating the above-mentioned structure.

Figure 3:
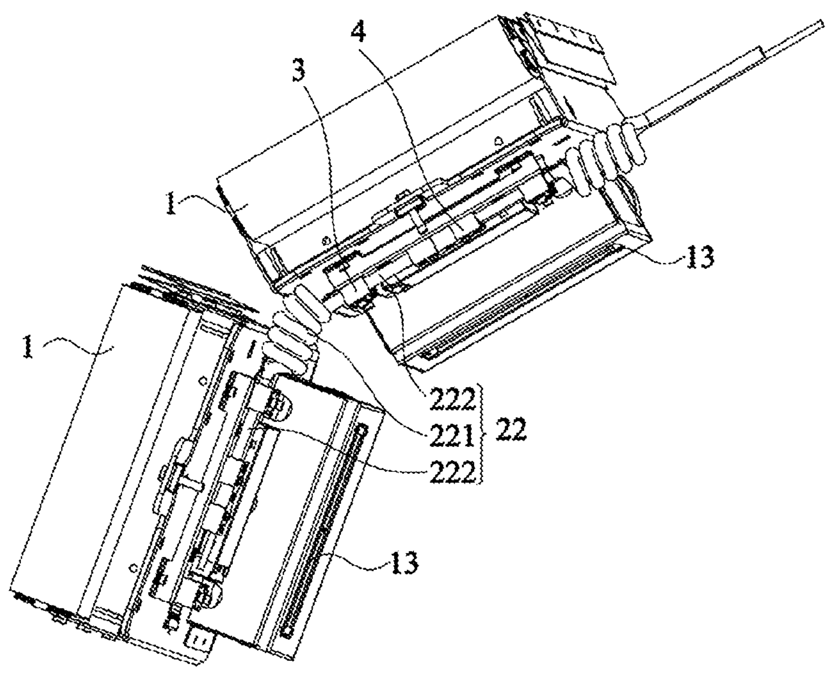
FIG. 3 is a schematic structural diagram of vehicle bodies and a wire harness structure according to an embodiment.

In order to address the above-mentioned issues, as shown in FIGS. 2 and 3, the wire harness structure 2 of this embodiment is connected to two adjacent vehicle bodies 1, the wire harness structure 2 includes an elastic deformation portion, and the elastic deformation portion is located at a junction of adjacent vehicle bodies 1. When the sorting vehicle 100 is in a turning position, the elastic deformation portion in the turning position undergoes elastic deformation, so that the bending force on the wire harness structure 2 is dispersed to the elastic deformation portion, thereby avoiding the occurrence of hard bending of the wire harness structure 2, ensuring the service life of the wire harness structure 2, and improving the operational stability of both the sorting vehicle 100 and the sorting machine 1000.

For example, as shown in FIG. 2, the elastic deformation portion is a spiral structure. When the adjacent vehicle bodies 1 are at a certain included angle, the spiral structure can undergo a significant degree of bending and deformation, allowing the sorting vehicle 100 to make large-angle bends.

Optionally, the wire harness structure 2 includes a wire core and an elastic sheath, the elastic sheath covers the periphery of the wire core, the elastic sheath can improve the elastic deformation capability of the spiral structure, and the spiral structure can be adapted to a greater degree of elastic deformation. For example, the elastic sheath may be made of polyvinyl chloride, polypropylene, and the like. If made of polypropylene, the sheath is non-toxic, odorless, lightweight, strong, and very hard, effectively ensuring the signal cable has a highly extendable spiral structure. An elastic sheath made of polypropylene exhibits an elastic deformation capability four to five times higher than that of an elastic sheath made of polyvinyl chloride. The structure of the wire harness structure 2 is described with reference to FIG. 2. As shown in FIG. 2, each of the vehicle bodies 1 includes a driver 13, the wire harness structure 2 includes a communication wire harness 21, and two first connecting portions 212 of the communication wire harness 21 are connected to drivers 13 of two adjacent vehicle bodies 1 respectively, to realize signal transmission between the vehicle bodies 1, and the communication wire harness 21 can realize signal transmission to the vehicle bodies 1.

If the whole wire harness structure 2 is processed into a thread shape, it may lead to an unstable connection between the wire harness structure 2 and the vehicle body 1, causing the wire harness structure 2 to easily detach from the vehicle body 1. In order to address the above issue, as shown in FIG. 2, the communication wire harness 21 includes a first elastic deformation portion 211 and first connecting portions 212 respectively arranged at two ends of the first elastic deformation portion 211, and the first elastic deformation portion 211 is located at a junction of adjacent vehicle bodies 1. The first connecting portion 212 includes a first straight line segment, and the two first straight line segments are fixed to the two adjacent vehicle bodies 1, respectively. Because the structure of the first straight segment is smoother than a threaded shape, it facilitates secure attachment to the vehicle body 1, ensuring a better fixation of the wire harness structure 2 to the vehicle body 1.

As shown in FIG. 2, the wire harness structure 2 further includes an electricity conductive wire harness 22. The electricity conductive wire harness 22 includes a second elastic deformation portion 221 and second connecting portions 222 arranged at two ends of the second elastic deformation portions 221, respectively, the second elastic deformation portion 221 is located at a junction of two adjacent vehicle bodies 1, and two second connecting portions 222 are fixed to two adjacent vehicle bodies 1 respectively. Optionally, each of the second connecting portions 222 includes a second straight line segment, and the two second straight line segments are fixed to the two adjacent vehicle bodies 1, respectively. The second straight line segment has a structure flatter than a threaded shape, which facilitates the fixing to the vehicle bodies 1, and can ensure that the electricity conductive wire harness structure 22 can be well fixed to the vehicle bodies 1.

Figure 4:
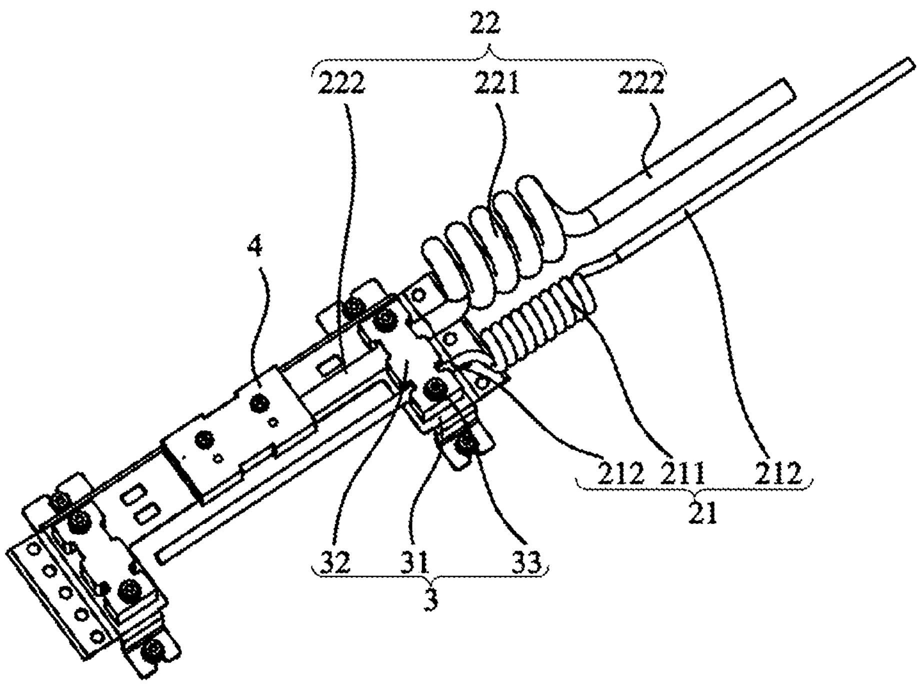
FIG. 4 is a schematic structural diagram of the wire harness structure and a fixing structure according to an embodiment.
Figure 5:
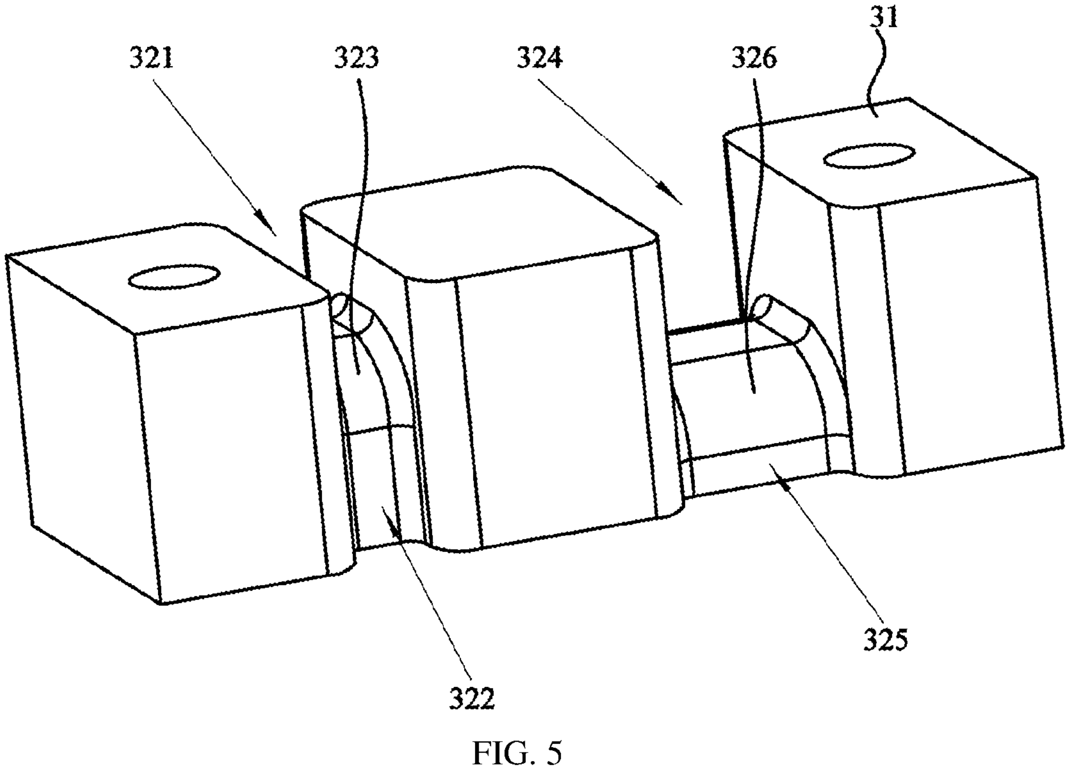
FIG. 5 is a schematic structural diagram of a wire crimping member according to an embodiment.

As shown in FIG. 2, at least three vehicle bodies are provided. The sorting vehicle further includes a wire splitter 4, a split wire 5 and a power supply. Each of the vehicle bodies 1 is provided with a wire splitter 4, and the wire splitter 4 is connected to a corresponding driver 13 via the split wire 5. The wire splitter 4 of the vehicle body 1 located in the middle is connected to the second connecting portions 222 of the two adjacent electricity conductive wire harnesses 22. The wire splitter 4 of the vehicle body 1 at an end is connected to the power source and the second connecting portion 222 of an adjacent electricity conductive wire harness 22, thereby facilitating power supply from the power source to different drivers 13. The sorting vehicle 100 further includes a fixing structure 3. For convenience of understanding the configuration of the fixing structure 3, the fixing structure 3 is as shown in FIG. 4. The fixing structure 3 includes a mounting plate 31, a wire crimping member 32, and a fixing member 33. The mounting plate 31 is arranged on the vehicle body 1. The wire crimping member 32, in conjunction with the mounting plate 31, clamps the first straight line segment and the second straight line segment. The fixing member 33 fixes the mounting plate 31 to the wire crimping member 32, so that the fixing structure 3 achieves the function of fixing the wire harness structure 2 to the vehicle bodies 1. This prevents the wire harness structure 2 from detaching from the vehicle bodies 1 during operation of the sorting vehicle 100, ensuring the normal operation of the sorting vehicle 100. To achieve a stable connection between the wire harness structure 2 and the vehicle bodies 1, in this embodiment, the wire crimping member 32 is block-shaped, providing greater strength and hardness, thereby achieving a firm clamping effect in conjunction with the mounting plate 31 on the first straight-line segment and second straight-line segment. For instance, the fixing member 33 could be a screw, a pin, or the like. As an optional embodiment, as shown in FIG. 5, the wire crimping member 32 is provided with an accommodating recess, and the first straight line segment and the second straight line segment are accommodated in the accommodating recess, so that the first straight line segment and the second straight line segment can be quickly mounted and positioned onto the wire crimping member 32, thereby improving the mounting efficiency of the wire harness structure 2, the fixing structure 3, and the vehicle bodies 1. Illustratively, a first accommodating recess 321 and a second accommodating recess 324, which are independent from each other, are provided in the block-shaped wire crimping member 32. The first accommodating recess 321 has a shape and size matching those of the first straight line segment, and the second accommodating recess 324 has a shape and size matching those of the second straight line segment, so that the physical isolation of the communication wire harness 21 from the electricity conductive wire harness 22 can be realized, thereby preventing interference of signals between the communication wire harness 21 and the electricity conductive wire harness 22, and ensuring normal operation of the communication wire harness 21 and the electricity conductive wire harness 22.

As an optional embodiment, a lower end side of the wire crimping member 32 is provided with an accommodating recess, a lateral side of the wire crimping member 32 is provided with a longitudinal recess in communication with the accommodating recess, and a bottom surface of the accommodating recess is connected to a bottom surface of the longitudinal recess by an arc transition surface. For example, as shown in FIG. 5, the lower end side of the wire crimping member 32 is provided with a first accommodating recess 321 and a second accommodating recess 324, the lateral side of the wire crimping member 32 is provided with a first longitudinal recess 322 and a second longitudinal recess 325, the first longitudinal recess 322 is in communication with the first accommodating recess 321, and the second longitudinal recess 325 is in communication with the second accommodating recess 324. A bottom surface of the first accommodating recess 321 is connected to a bottom surface of the first longitudinal recess 322 by a first arc transition surface 323, and a bottom surface of the second accommodating recess 324 is connected to a bottom surface of the second longitudinal recess 325 by a second arc transition surface 326. The first arc transition surface 323 and the second arc transition surface 326 can reduce stress concentration on the first straight line segment and the second straight line segment, avoid damage to the first straight line segment and the second straight line segment, and improve the service life of the communication wire harness 21 and the electricity conductive wire harness 22.

In another optional embodiment, considering that the first straight line segment and the second straight line segment can undergo certain elastic deformation, the depth of the first accommodating recess 321 is 1 mm to 2 mm less than the diameter of the first straight line segment, and the depth of the second accommodating recess 326 is 1 mm to 2 mm less than the diameter of the second straight line segment. When the fixing structure 3 secures both the first straight line segment and the second straight line segment to the vehicle bodies 1, the wire crimping member 32, in conjunction with the mounting plate 31, can tightly clamp both the communication wire harness 21 and the electricity conductive wire harness 22.

What is claimed is:

1. A sorting vehicle, comprising:

at least two vehicle bodies pivotally connected to one another in sequence; and a wire harness structure connected to two adjacent vehicle bodies;

wherein the wire harness structure comprises a communication wire harness, the communication wire harness comprises a first elastic deformation portion and two first connecting portions respectively arranged at two ends of the first elastic deformation portion, the first elastic deformation portion is located at a junction of two adjacent vehicle bodies, each of the two first connecting portions comprises a first straight line segment, and two first straight line segments are fixed to the two adjacent vehicle bodies, respectively;

wherein each of the at least two vehicle bodies comprises a driver, and two first connecting portions of the communication wire harness are connected to drivers of two adjacent vehicle bodies respectively:

wherein the wire harness structure further comprises an electricity conductive wire harness, the electricity conductive wire harness comprises a second elastic deformation portion, and two second connecting portions respectively arranged at two ends of the second elastic deformation portion, the second elastic deformation portion is located at a junction of two adjacent vehicle bodies, each of the two second connecting portions comprises a second straight line segment, and two second straight line segments are fixed to two adjacent vehicle bodies, respectively.

2. The sorting vehicle according to claim 1, wherein at least one of the first elastic deformation portion and the second elastic deformation portion is a spiral structure.

3. The sorting vehicle according to claim 1, wherein at least three vehicle bodies are provided, the sorting vehicle further comprises a wire splitter, a split wire and a power supply, each of the at least three vehicle bodies is provided with a wire splitter connected to a corresponding driver via a split wire; a wire splitter of a vehicle body located in a middle of the at least three vehicle bodies is connected to second connecting portions of two electricity conductive wire harnesses adjacent to the wire splitter of the vehicle body located in the middle of the at least three vehicle bodies; and a wire splitter of a vehicle body at an end of the at least three vehicle bodies is connected to a power source, and a second connecting portion of an electricity conductive wire harness adjacent to the wire splitter of the vehicle body at the end of the at least three vehicle bodies.

4. The sorting vehicle according to claim 3, further comprising a fixing structure, wherein the fixing structure fixes a wire harness structure to a vehicle body, and the fixing structure comprises:

a mounting plate, arranged on a vehicle body;

a wire crimping member, in conjunction with the mounting plate, clamping the first straight line segment and the second straight line segment; and a fixing member, fixing the mounting plate to the wire crimping member.

5. The sorting vehicle according to claim 4, wherein the wire crimping member is provided with accommodating recesses, and the first straight line segment and the second straight line segment are respectively accommodated in the accommodating recesses.

6. The sorting vehicle according to claim 5, wherein a lower end side of the wire crimping member is provided with the accommodating recesses, a lateral side of the wire crimping member is provided with longitudinal recesses respectively in communication with the accommodating recesses, and a bottom surface of each of the accommodating recesses is connected to a bottom surface of a respective one of the longitudinal recesses by an arc transition surface.

7. A sorting machine, comprising the sorting vehicle according to claim 1, and a track assembly, wherein the sorting vehicle is configured to move on the track assembly.

8. The sorting machine according to claim 7, wherein at least one of the first elastic deformation portion and the second elastic deformation portion is a spiral structure.

9. The sorting machine according to claim 8, wherein at least three vehicle bodies are provided, the sorting vehicle further comprises a wire splitter, a split wire and a power supply, each of the at least three vehicle bodies is provided with a wire splitter connected to a corresponding driver via a split wire; a wire splitter of a vehicle body located in a middle of the at least three vehicle bodies is connected to second connecting portions of two electricity conductive wire harnesses adjacent to the wire splitter of the vehicle body located in the middle of the at least three vehicle bodies; and a wire splitter of a vehicle body at an end of the at least three vehicle bodies is connected to a power source, and a second connecting portion of an electricity conductive wire harness adjacent to the wire splitter of the vehicle body at the end of the at least three vehicle bodies.

10. The sorting machine according to claim 9, wherein the sorting vehicle further comprises a fixing structure, wherein the fixing structure fixes a wire harness structure to a vehicle body, and the fixing structure comprises:

a mounting plate, arranged on a vehicle body;

a wire crimping member, in conjunction with the mounting plate, clamping the first straight line segment and the second straight line segment; and a fixing member, fixing the mounting plate to the wire crimping member.

11. The sorting machine according to claim 10, wherein the wire crimping member is provided with accommodating recesses, and the first straight line segment and the second straight line segment are respectively accommodated in the accommodating recesses.

12. The sorting machine according to claim 11, wherein a lower end side of the wire crimping member is provided with the accommodating recesses, a lateral side of the wire crimping member is provided with longitudinal recesses respectively in communication with the accommodating recesses, and a bottom surface of each of the accommodating recesses is connected to a bottom surface of a respective one of the longitudinal recesses by an arc transition surface.

* * * * *